United States Patent [19]

Hirota

[11] Patent Number: 5,091,978
[45] Date of Patent: Feb. 25, 1992

[54] APPARATUS FOR LINE SCANNING A DOCUMENT

[75] Inventor: Yoshihiko Hirota, Osaka, Japan

[73] Assignee: Minolta Camera Kabushiki Kaisha, Osaka, Japan

[21] Appl. No.: 214,442

[22] Filed: Jul. 1, 1988

[30] Foreign Application Priority Data

Jul. 3, 1987 [JP] Japan .................. 62-167244

[51] Int. Cl.$^5$ .................................. G06K 9/00
[52] U.S. Cl. .............................. 382/67; 382/44; 358/474; 358/483
[58] Field of Search ............. 382/67, 68, 44; 358/414, 483, 496, 497

[56] References Cited

U.S. PATENT DOCUMENTS

| | | | |
|---|---|---|---|
| 4,147,928 | 4/1979 | Crean et al. ............... | 382/67 |
| 4,424,590 | 1/1984 | Ozawa ....................... | 382/68 |
| 4,449,151 | 5/1984 | Yokota et al. .............. | 358/483 |
| 4,467,365 | 8/1984 | Murayama et al. .......... | 358/293 |
| 4,532,551 | 7/1985 | Kurata et al. .............. | 358/293 |
| 4,553,160 | 11/1985 | Yamamoto et al. .......... | 358/75 |
| 4,617,596 | 10/1986 | Yoshida et al. ............. | 358/280 |
| 4,682,216 | 7/1987 | Sasaki et al. ............... | 358/79 |
| 4,700,236 | 10/1987 | Abe .......................... | 358/284 |
| 4,734,787 | 3/1988 | Hayashi ..................... | 358/293 |
| 4,742,240 | 5/1988 | Yamanishi et al. .......... | 250/578 |
| 4,760,466 | 7/1988 | Nakamura .................. | 358/294 |
| 4,771,333 | 9/1988 | Michaels .................... | 358/483 |

FOREIGN PATENT DOCUMENTS 60-11673  6/1985  Japan .

Primary Examiner—Michael Razavi
Attorney, Agent, or Firm—Burns, Doane, Swecker & Mathis

[57] ABSTRACT

An image reading apparatus having a line image sensor for line scanning a document. The line image sensor includes plural sensor chips aligned in a main scan direction for outputting image signals. Plural analogue to digital converters convert analogue image signals output from respective image sensor chips into digital form. Plural FIFO memories store the digitalized image data. The digitalized image data obtained from each of the sensor chips is written in parallel into the corresponding memory. The digitalized image data is output serially in the order of alignment of the sensor chips.

10 Claims, 14 Drawing Sheets

Spectro sensitivity characteristic (Ta=25°C)

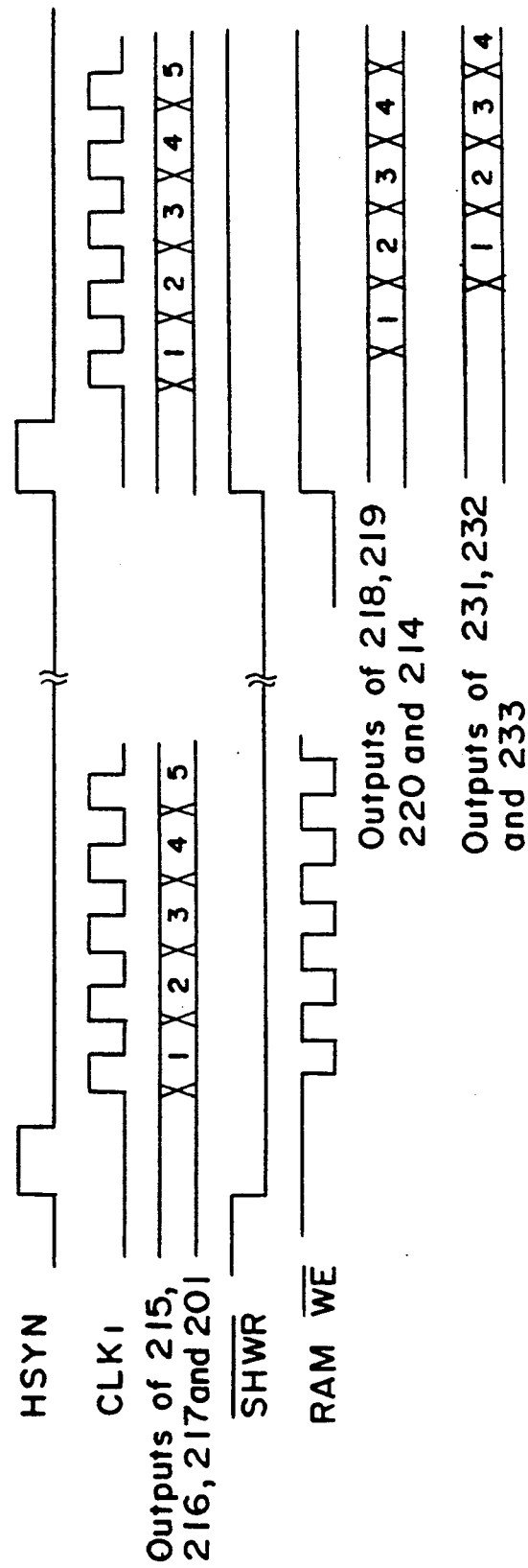

APPARATUS FOR LINE SCANNING A DOCUMENT

BACKGROUND OF THE INVENTION

1. Field of the Invention

The present invention relates to an image reading apparatus providing a line image sensor of contact type for line scanning a document.

2. Description of the Prior Art

The color CCD (charge coupled device) image sensor of contact type is widely used for the color image reading apparatus. An image of a document is dissolved into plural light components (usually three primary color red (R), green (G) and blue (B) components) and those light components are transduced to color data by photo-electric transducers, respectively. Then, respective color data is converted into digital data. These digital data are binarized according to a predetermined method such as the dither method after shading correction to them is performed. The binarized data are outputted to an external device such as a printer.

The CCD sensor of contact type has a limitation with respect to the scanning speed thereof and, accordingly, it is impossible to read a document faster than the limitation. A time interval necessary for reading a document is increased as the integration density of the CCD image sensor is increased.

In a highly integrated CCD image sensor, plural CCD sensor chips are arranged alternatively along the lengthwise direction of the CCD image sensor and each chip provides a signal output terminal. In a conventional CCD image sensor, respective chips are driven serially in the order of alignment of them and respective output signals from them are transmitted, via analogue switches, to a single signal line.

According to this conventional signal processing, it is difficult to speed up the reading speed of a document image.

SUMMARY OF THE INVENTION

An essential object of th present invention is to provide an image reading apparatus being able to speed up the reading speed of a document image.

Another object of the present invention is to provide an image reading apparatus having a line image sensor of contact type comprised of plural image sensor chips in which image signals obtained by respective image sensor chips can be processed parallel.

One more object of the present invention is to provide an image reading apparatus having a line image sensor of contact type wherein writing of image data and reading thereof can be performed parallel.

In order to accomplish these objects, according to the present invention, there is provided an image reading apparatus comprising an image reading device for line scanning an image of a document to output an analogue image signal, said image reading device including a line image sensor being comprised of plural sensor chips arranged along a line in the lengthwise direction of said line sensor each which is comprised of a plenty of image sensing devices and has an output terminal for outputting an analogue signal including each output of individual image sensing devices, plural analogue to digital conversion means for converting analogue image signals outputted from said sensor chips, respectively, each of which is connected to the output terminal of each image sensor chip, plural memory means for memorizing image signal digitalized by said plural analogue to digital conversion means each of which is provided to every one of said plural analogue to digital conversion means, said memory means being comprised of a first-in-first-out (FIFO) memory in which writing data thereinto and reading data therefrom can be done in asynchronous with each other, and a control means for writing digitalized image signals of said plural sensor chips into said respective memory means parallel and for outputting a serial image signal with respect to the same scan line by reading said digitalized image signals stored in respective memory means in the order of alignment of said plural sensor chips.

According to the present invention, image signals obtained by individual image sensor chips are stored into respective memory means parallel and image signals stored in respective memory means are read out at different timings so as to form one scan line data. Then, image signals forming one scan line data are outputted serially.

Further, according to the present invention, each memory means is comprised of a FIFO memory. Therefore, writing of image data into the memory means and reading of stored image data therefrom can be done parallel. This enables to speed up the reading speed independently to the writing speed. This contributes to speed up the reading speed of the image reading apparatus much more.

According to another aspect of the present invention, there is provided an image reading apparatus having an illuminating means for illuminating a document, an image reading means for reading an image of the illuminated document by transducing the light reflected from the document into electric signals, said image reading means being comprised of plural CCD sensor chips arranged in the main scanning direction each of which has a signal output terminal, a scanning means for line scanning said document by moving said document and image reading means relatively in the subscan direction, a driving means for driving said CCD sensor chips parallel to output analogue image signals from respective signal output terminals of said plural sensor chips, plural analogue to digital conversion means for converting analogue image signals into digital image signals each of which is provided for each CCD sensor chip, plural memory means for memorizing said digital image signals converted by said analogue to digital conversion means each of which is provided for each CCD sensor chip, each of said plural memory means being comprised of a first-in-first-out (FIFO) memory in which writing data thereinto and reading data therefrom can be done in asynchronous with each other, and a control means for writing digitalized image signals of said plural sensor chips into said respective memory means parallel and for outputting a serial image signal with respective memory means in the order of alignment of said plural sensor chips.

BRIEF DESCRIPTION OF DRAWINGS

These and other objects and features of the present invention will become more apparent when the preferred embodiment of the present invention is described in detail with reference of accompanied drawings in that;

FIG. 17 is a timing chart of the shading & γ correction circuit.

DETAILED DESCRIPTION OF THE PREFERRED EMBODIMENT (a) Compositions of CCD line image sensor and image reading apparatus FIG. 1 shows essential elements of a color image reading apparatus according to the present invention.

Figure 1:
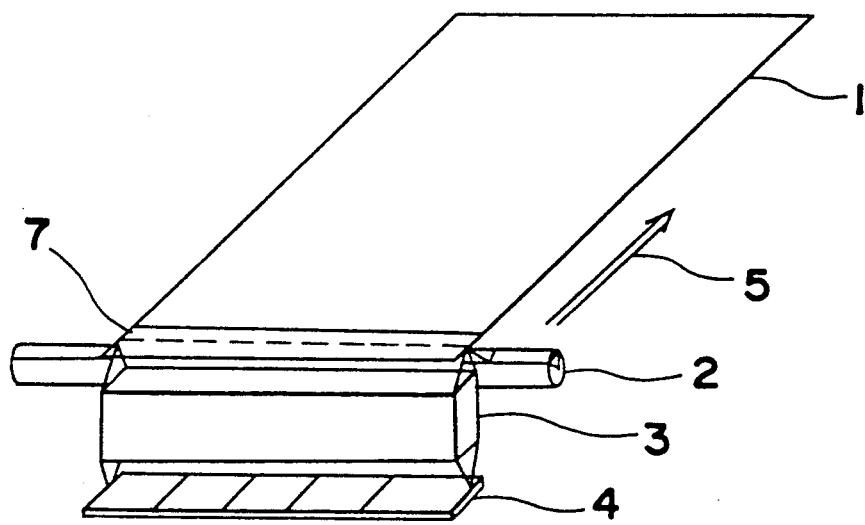
FIG. 1 is a schematic perspective view of a line scanning system of an image reading apparatus according to the present invention.

A document 1 is illuminated linearly by a light source 2 such as a fluorescent lamp which emits a light having a spectropic distribution including light components of red (R), green (G) and blue (B). The light reflected from the surface of the document 1 is focused linearly on a light receiving surface of a CCD line image sensor 4 (hereafter, referred to CCD sensor) at equal magnification by a rod lens array 3.

An optical scanning system including the light source 2, rod lens array 3 and CCD sensor 4 is moved in a direction indicated by an arrow 5 by a driving means (not shown) in order to line scan the document 1 and light information obtained by the line scan is transduced into electric image signals by CCD sensor 4. CCD sensor 4 is a CCD line sensor of contact type with built-in memory which dissolves the light information into three primary colors of R, G and B and transduces respective primary color components into electric signals.

Figure 2:
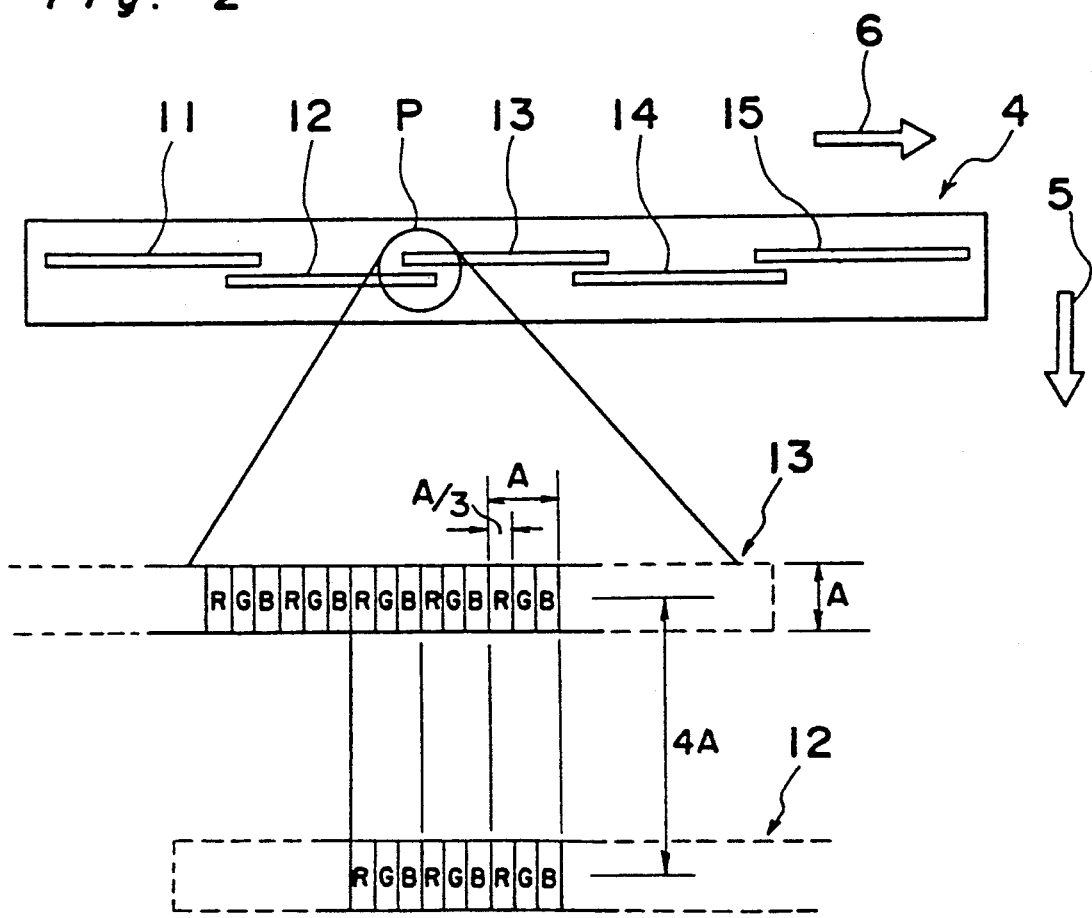
FIG. 2 is a schematic plan view of a CCD line image sensor including an enlarged view of a part thereof.

FIG. 2 shows a schematical plan view of CCD sensor 4 and partially enlarged view of a portion encircled by P.

CCD sensor 4 is comprised of five CCD sensor chips 11 through 15 each of which has effective reading picture elements of 2928 dots. These CCD sensor chips 11 through 15 are arranged parallel and alternatively with respect to the lengthwise direction of CCD sensor 4 and formed so as to be able to read a document of A3 size with a resolution of 16 lines per mm. Each picture element of respective CCD sensor chip is divided into three portions in the lengthwise direction thereof (sometimes, referred to the main scan direction) on which three filters for primary colors R, G and B are formed by deposition, respectively.

These CCD sensor chips 11 through 15 are aligned in series in the main scan direction and alternatively with a distance 4A of four picture elements in the direction of width of CCD sensor 4 (sometimes, referred to the subscan direction). Output signals $OS_1$ through $OS_5$ from CCD sensor chips 11 through 15 are outputted parallel, as will be stated in detail later.

Figure 3:
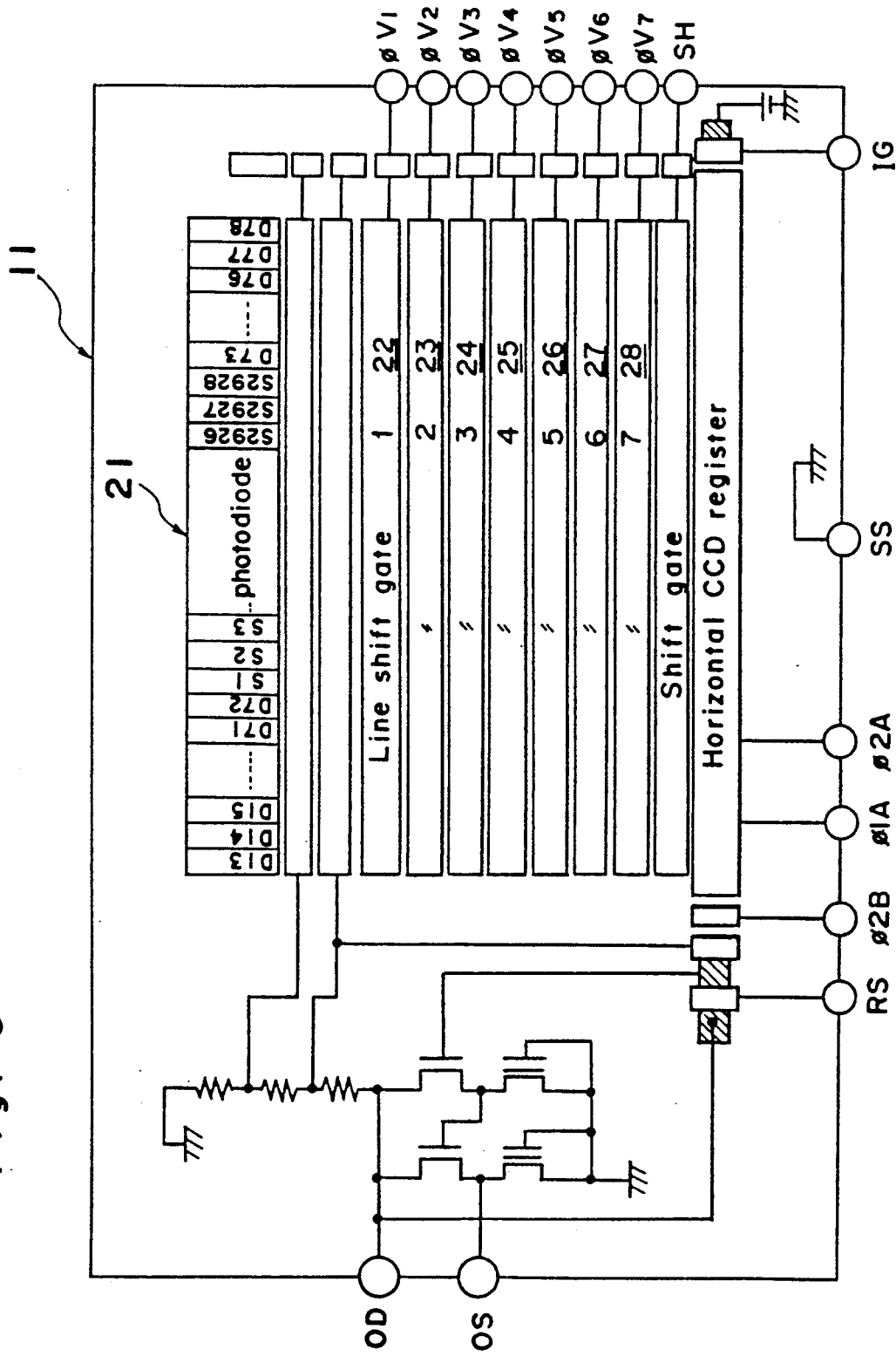
FIG. 3 is a block diagram of one of CCD sensor chips constituting the CCD line image sensor.

FIG. 3 shows a block diagram of CCD sensor chip 11. Other CCD sensor chips 12 through 15 have the composition substantially same to that of the CCD sensor chip 11.

As shown in FIG. 3, the CCD sensor chip 11 provides photodiode array 21 comprised of 2928 photodiodes aligned on a line each of which forms an effective picture element and, on the both sides of the photodiode array 21, dummy picture elements D13 through D72 and D73 through D78 are arranged, respectively. The CCD sensor chip 11 is of a type with built-in memory and provides seven shift gates 22 through 28 each of which is able to store one line data obtained thereby. These line shift gates 22 through 28 are driven by pulses $\phi V_1$ through $\phi V_7$, respectively.

As stated above, two CCD sensor chips 12 and 14 are arranged distant from three CCD sensor chips 11, 13 and 15 by the distance 4A of four picture elements when seen in the subscan direction. Accordingly, pulses $\phi V_1$ through $\phi V_7$ to be applied to line shift gates 22 through 28 of each of CCD sensor chips 12 and 14 are delayed by a time interval necessary for scanning four scan lines in the subscan direction when compared with those of each of CCD sensor chips 11, 13 and 15. This enables to obtain image data on the same scan line as a whole by CCD sensor 4. Other structures of CCD sensor chip 11 are well known to those skilled in the art and, therefore, explanation about them is abbreviated.

Figure 4:
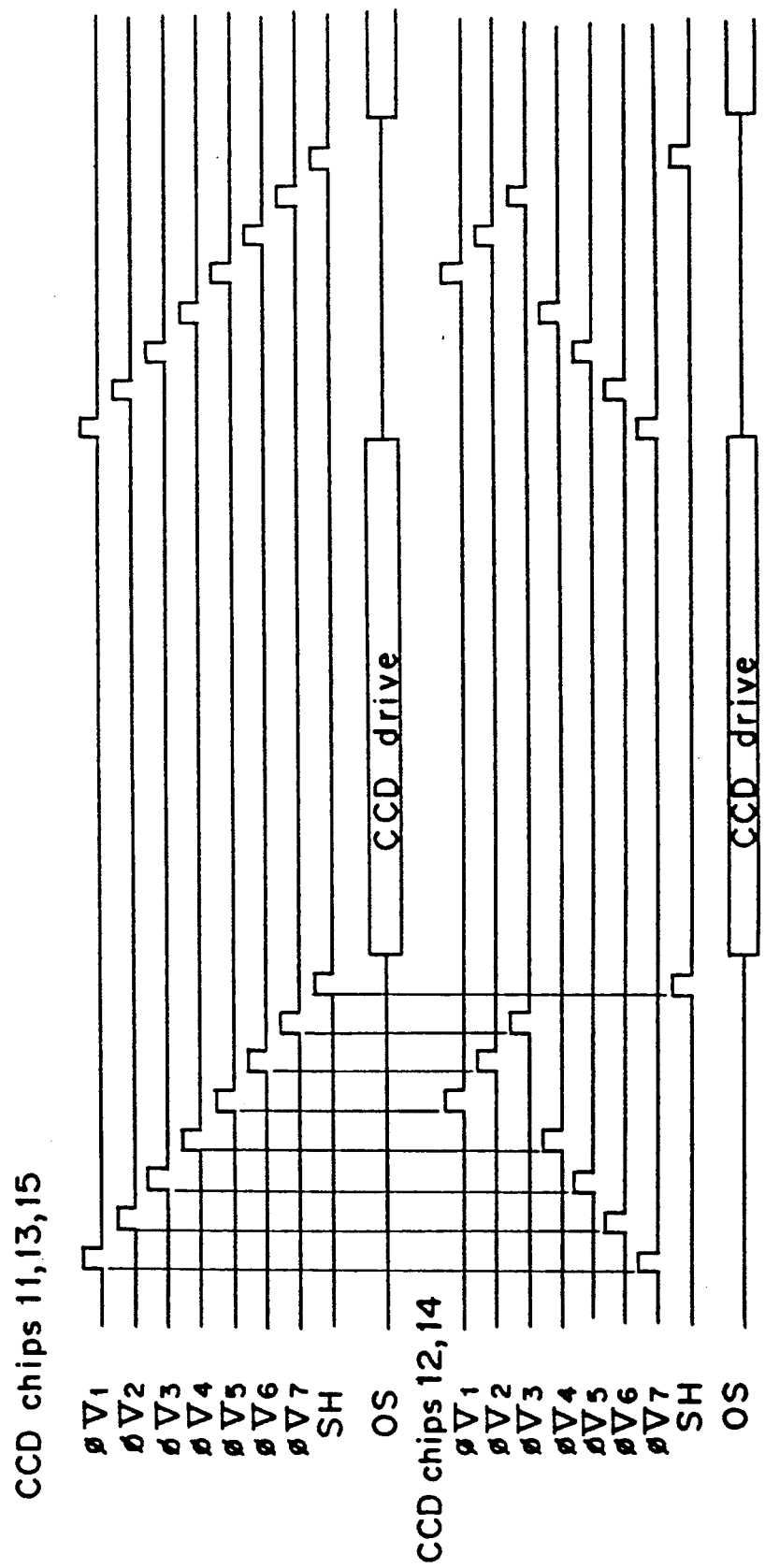
FIG. 4 is a timing chart for driving individual CCD sensor chips.

FIG. 4 shows a time chart of pulses $\phi V_1$ through $\phi V_7$. As shown clearly in FIG. 4, each of pulses $\phi V_1$ through $\phi V_7$ with respect to each of CCD sensor chips 12 and 14 is delayed by a time interval of four pulse cycles when compared with that with respect to each of CCD sensor chips 1, 13 and 15. As the result of that, all of CCD sensor chips are deemed as if they are aligned on the same line and image signals with respect to the same scan line can be obtained from them.

Figure 5:
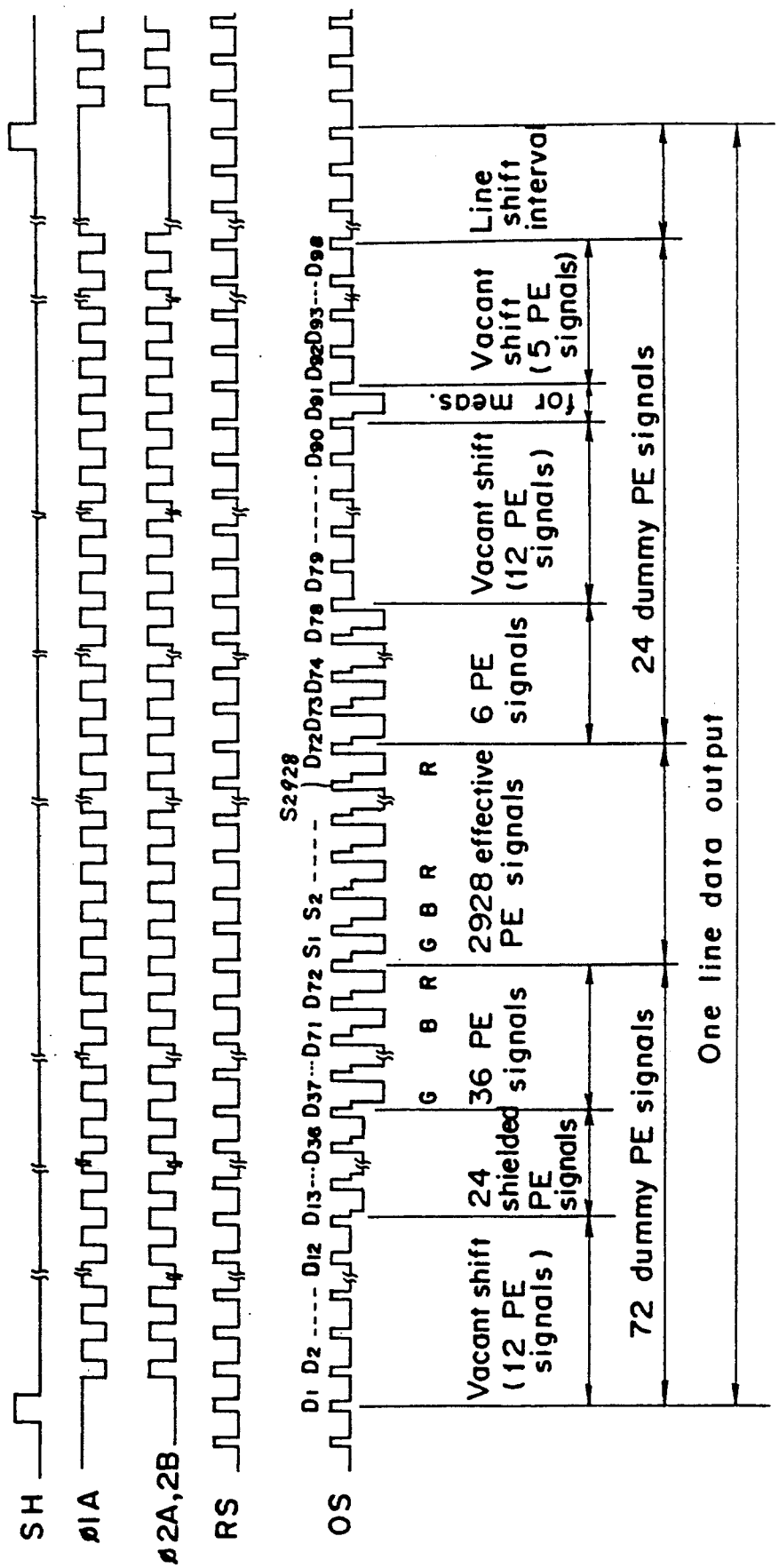
FIG. 5 is a timing chart for driving one of CCD sensor chips.

FIG. 5 shows a time chart of various pulses necessary for driving individual CCD sensor chips 11 through 15. In order to drive each CCD sensor chip, twelve pulses in sum including $\phi V_1$ through $\phi V_7$, SH, $\phi 1A$, $\phi 2A$, $\phi 2B$ and RS are applied thereto.

As is clearly shown in FIG. 5, five pulses SH, $\phi 1A$, $\phi 2A$, $\phi 2B$ and RS other than $\phi V_1$ through $\phi V_7$ are applied at same timings irrespective to the order of alignment of CCD sensor chips.

Each CCD sensor chip is started to output respective image signal when a shift pulse SH is applied thereto. When pulses $\phi 1A$, $\phi 2A$, $\phi 2B$ and RS are applied thereto, respectively, an analogue image signal including outputs from individual picture elements of each CCD sensor chip are outputted from an output terminal OS thereof in synchronous with RS pulses.

Figure 6:
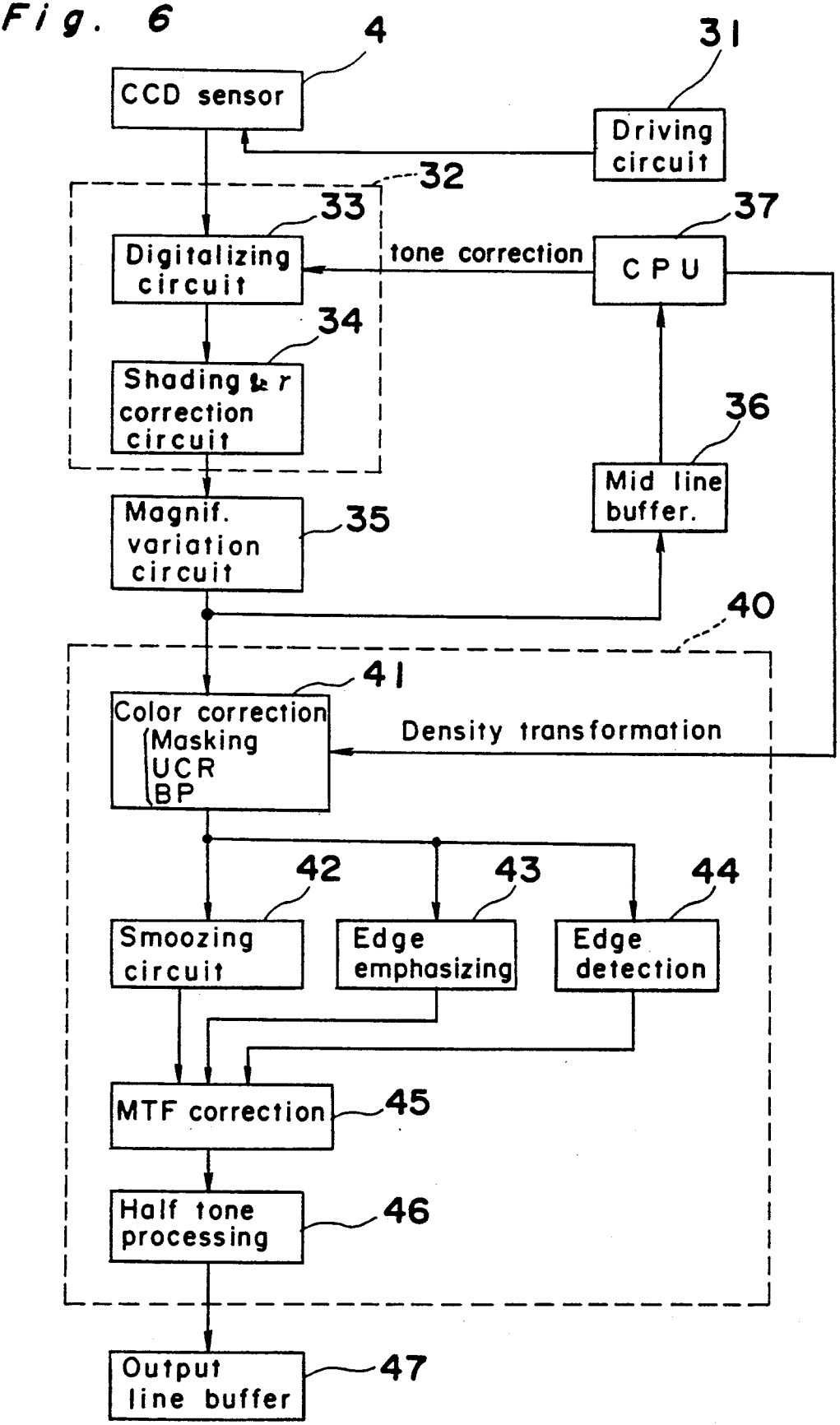
FIG. 6 is a block diagram of the image reading apparatus according to the present invention.

FIG. 6 shows a block diagram of the color image reading apparatus.

The color image reading apparatus repeats the line scan to a document four times and color information of R, G and B dissolved upon every line scan is transformed into print data of cyan (C), magenta (M), yellow (Y) and black (BL) sequentially and each color print data is outputted to an external output apparatus such as a color printer.

The color image reading apparatus is comprised of a signal correction block 32 for correcting a signal obtained by CCD sensor 4, a magnification variation block 35 and an image processing block 40 for performing various image processings.

CCD sensor 4 transduces respective light information R, G and B of one scan line of a document into an electrical signal including outputs of all picture elements and outputs individual picture element signals serially. Each picture element signal is converted into digital data by a digitalizing circuit 33 and each digital data is corrected by a circuit 34 for shading correction and $\gamma$ correction. Then, these digital image data are electrically magnified or reduced in accordance with a designated magnification by a magnification variation circuit 35.

Magnified or reduced image data are transmitted to a mid line buffer 36 and a color correction circuit 41, respectively. CPU 37 controls the standard or reference voltage to be applied to the digitalizing circuit 33 in order for color correction in accordance with data stored in the mid line buffer 36.

The data transmitted to the color correcting circuit 41 are subjected to masking processing, processing for removing a color of under ground of a paper and processing for adding black printing data thereby. Thereafter, the corrected data are processed by a smoothing circuit 42, a circuit 43 for emphasizing outlines in the image of a document and a detection circuit 44 for detecting individual edges of a document, respectively. Then, they are corrected by an MTF correction circuit 45. Further, the corrected data are binarized by a halftone processing circuit 46 according to a binarization method such as a dither method or the like. Thereafter, the binarized data are outputted, via an output line buffer 47, to an external output apparatus such as a printer.

CCD sensor 4 is driven by signals SH, $\phi 1A$, $\phi 2A$, $\phi 2B$, RS and $\phi V_1$ to $\phi V_7$ generated by the driving circuit 1. CPU 37 outputs data for setting color balance to the digitalizing circuit 33.

(b) Digitalizing process and color balance correction for image signals

Figure 7:
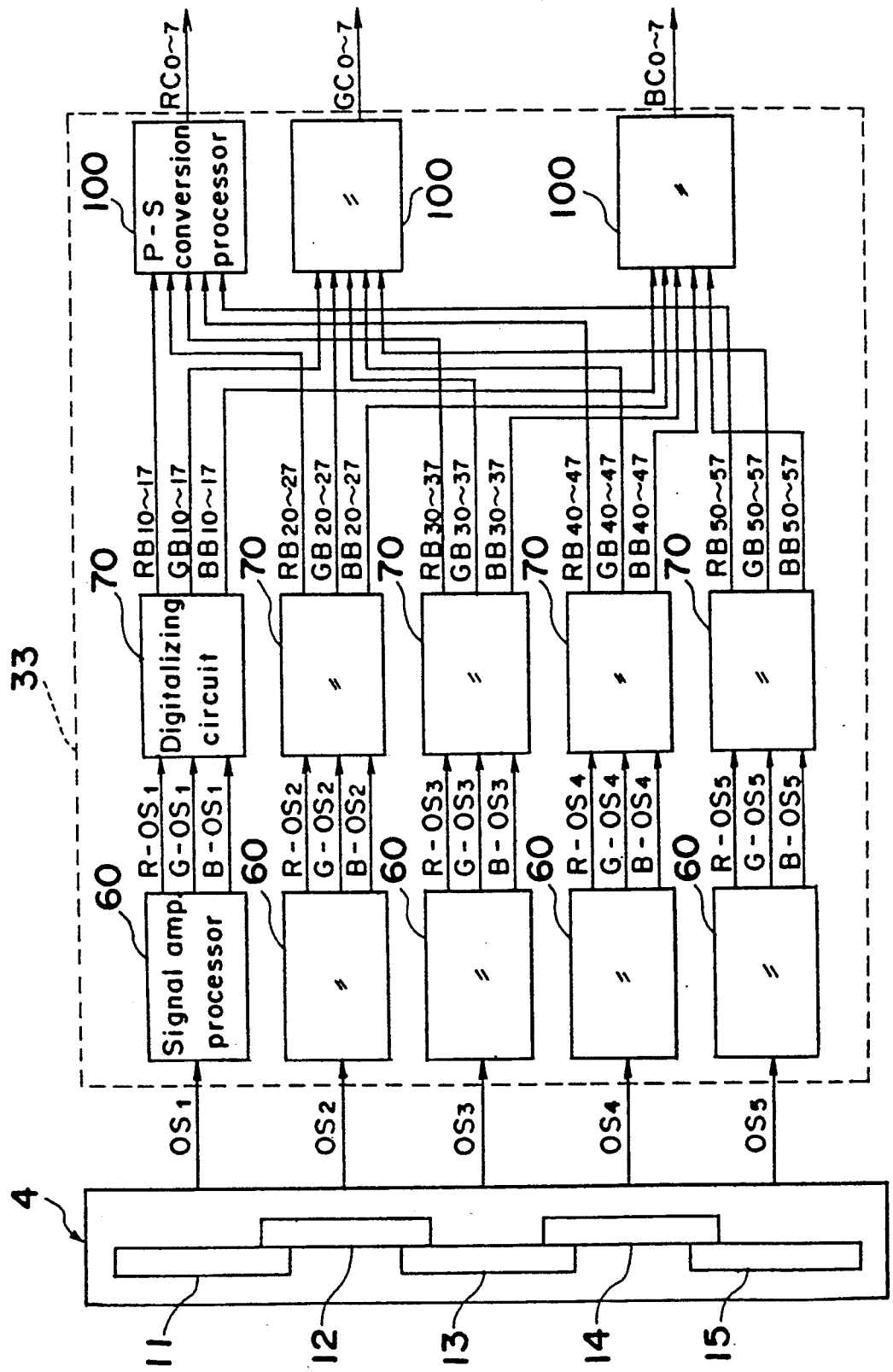
FIG. 7 is a block diagram of an analogue signal processing circuit according to the present invention.

As shown in FIG. 7, output signals $OS_1$ to $OS_5$ from individual CCD sensor chips 11 to 15 are input to corresponding signal amplification processing circuits 60 provided in the digitalizing circuit 33 and each of output signals $OS_1$ to $OS_5$ is dissolved into three primary color signals thereby.

The reason why respective output signals $OS_1$ to $OS_5$ are not amplified directly is that each of them includes a relatively high off-set voltage as will be explained later.

As stated referring to FIG. 5, each of output signals $OS_1$ to $OS_5$ of CCD sensor chips 11 to 15 is outputted in synchronous with each of pulses $RS_1$ to $RS_5$ applied to each of CCD sensor chips 11 to 15 during one time interval set for outputting one line data.

Figure 8:
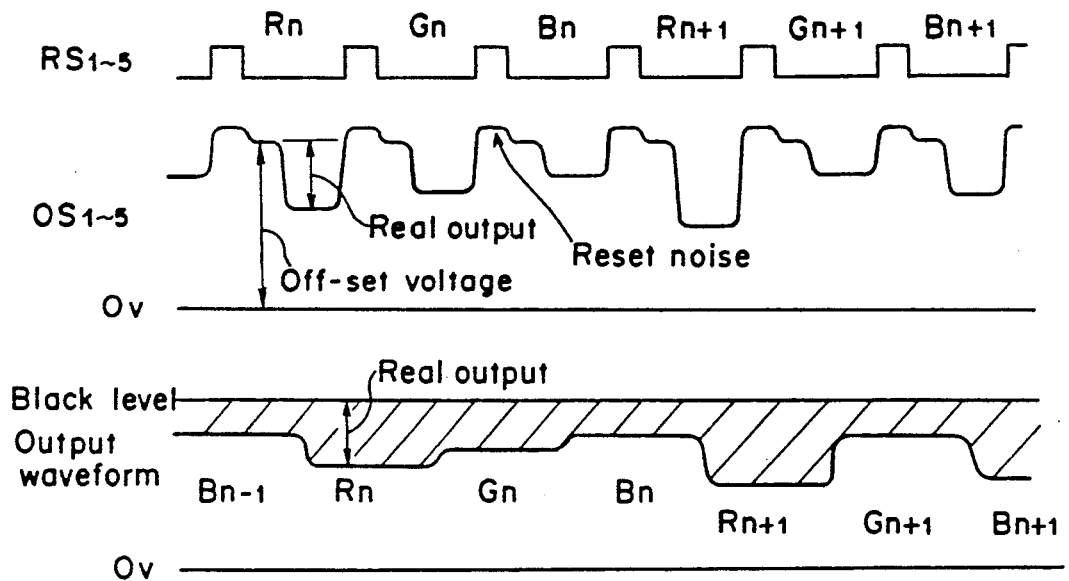
FIG. 8 shows waveforms of an output signal of one of CCD sensor chips and a shaped signal thereof.

As shown in FIG. 8, each of effective picture element signals contained in each of output signals $OS_1$ to $OS_5$ falls by an amplitude proportional to the intensity of incident light, but contains a reset noise and an off-set voltage of about 5 to 6 volts. The maximum amplitude of the picture element signal, namely the saturated voltage of the output signal is about 1 volt. On the other hand, signals indicating a voltage of black level which gives the off-set voltage are outputted from optically shielded picture elements $D_{13}$ through $D_{36}$ of each CCD sensor chip before effective picture element signals are outputted (see FIG. 5).

Since the off-set voltage is too high in comparison with the amplitude of each effective picture element signal, it is difficult to digitalize output signals $OS_1$ to $OS_5$ of CCD sensor chips 11 to 15 directly. In order to avoid this problem, the signal amplification processing circuit 60 is prepared in the present preferred embodiment.

Figure 9:
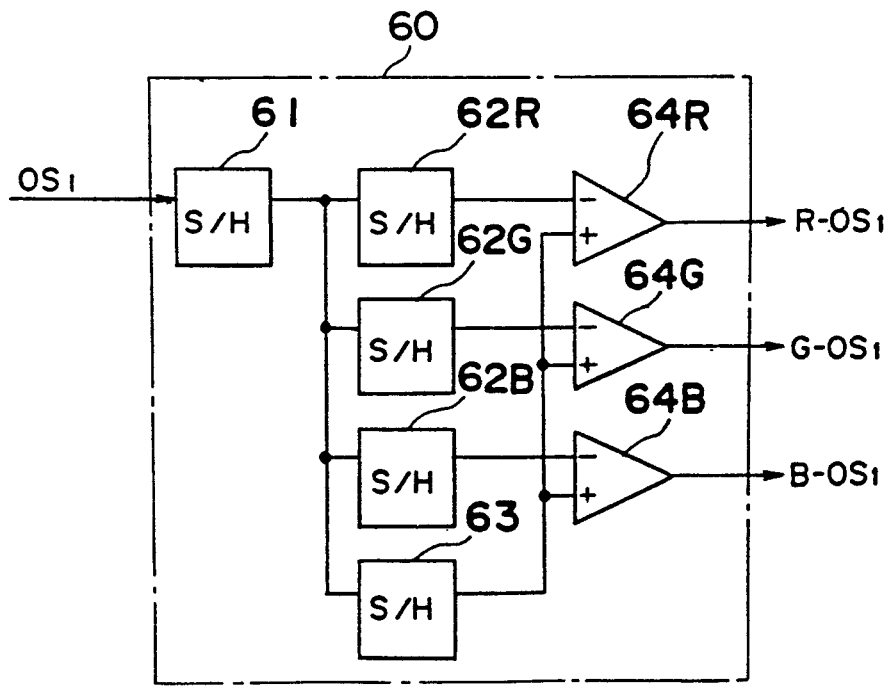
FIG. 9 is a block diagram of the signal amplifying and processing circuit shown in FIG. 7.

FIG. 9 shows a composition of the signal amplification processing circuit 60. Although only signal amplification processing circuit 60 for the output signal $OS_1$ of the CCD sensor chip 11 is shown in FIG. 9, the same circuit is provided for each of other CCD sensor chips 12 to 15.

Figure 10:
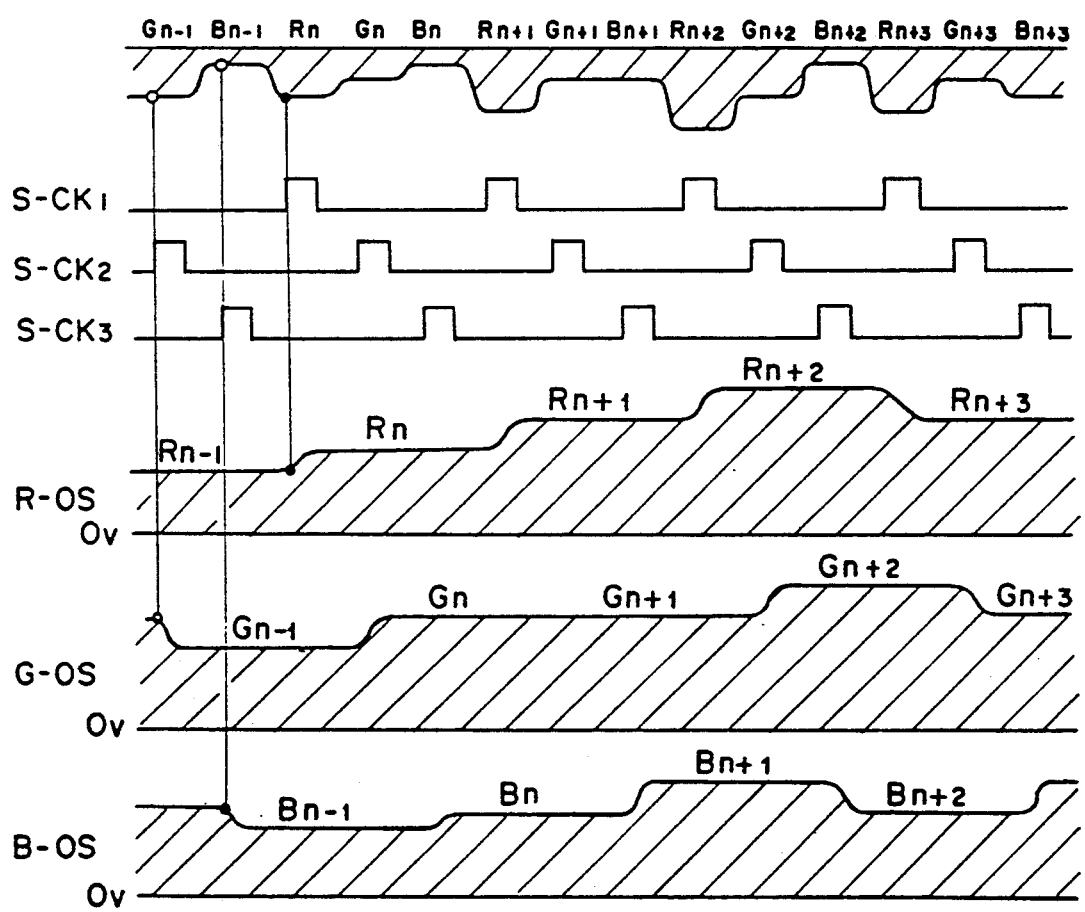
FIG. 10 is a time chart showing waveforms of R, G and B output signals outputted from the signal amplifying and processing circuit shown in FIG. 9.

Output signal $OS_1$ input into the signal amplification processing circuit 60 is shaped in waveform thereof by a sample and hold circuit 61 in order to remove respective reset noises contained therein (see the waveform indicated by $R_n$, $G_n$, $B_n$ or the like in FIG. 8). Then, the shaped output signal $OS_1$ including dissolved color signals of R, G and B serially is transformed into parallel signals by sample and hold circuits 62R, 62G and 62B. As shown in FIG. 10, clock pulses S-CK$_1$, S-CK$_2$ and S-CK$_3$ are applied to the sample and hold circuits 62R, 62G and 62B, respectively and each of them samples corresponding color signal at "high" level of the clock pulse and holds it at "low" level of the same. One more sample and hold circuit 63 is provided for holding the level of the output of the light shielded picture element (the voltage of the black level) during every output of one scan line data. Each of amplifying circuits 64R, 64G and 64B amplifies the difference between the corresponding color signal held thereby and the black signal level held by the sample and hold circuit 63. Namely, as shown in FIG. 10, each amplitude of color signals is amplified about three times in the positive direction after removing the off-set voltage to obtain individual amplified image signals R-OS$_1$, G-OS$_1$ and B-OS$_1$.

Figure 11:
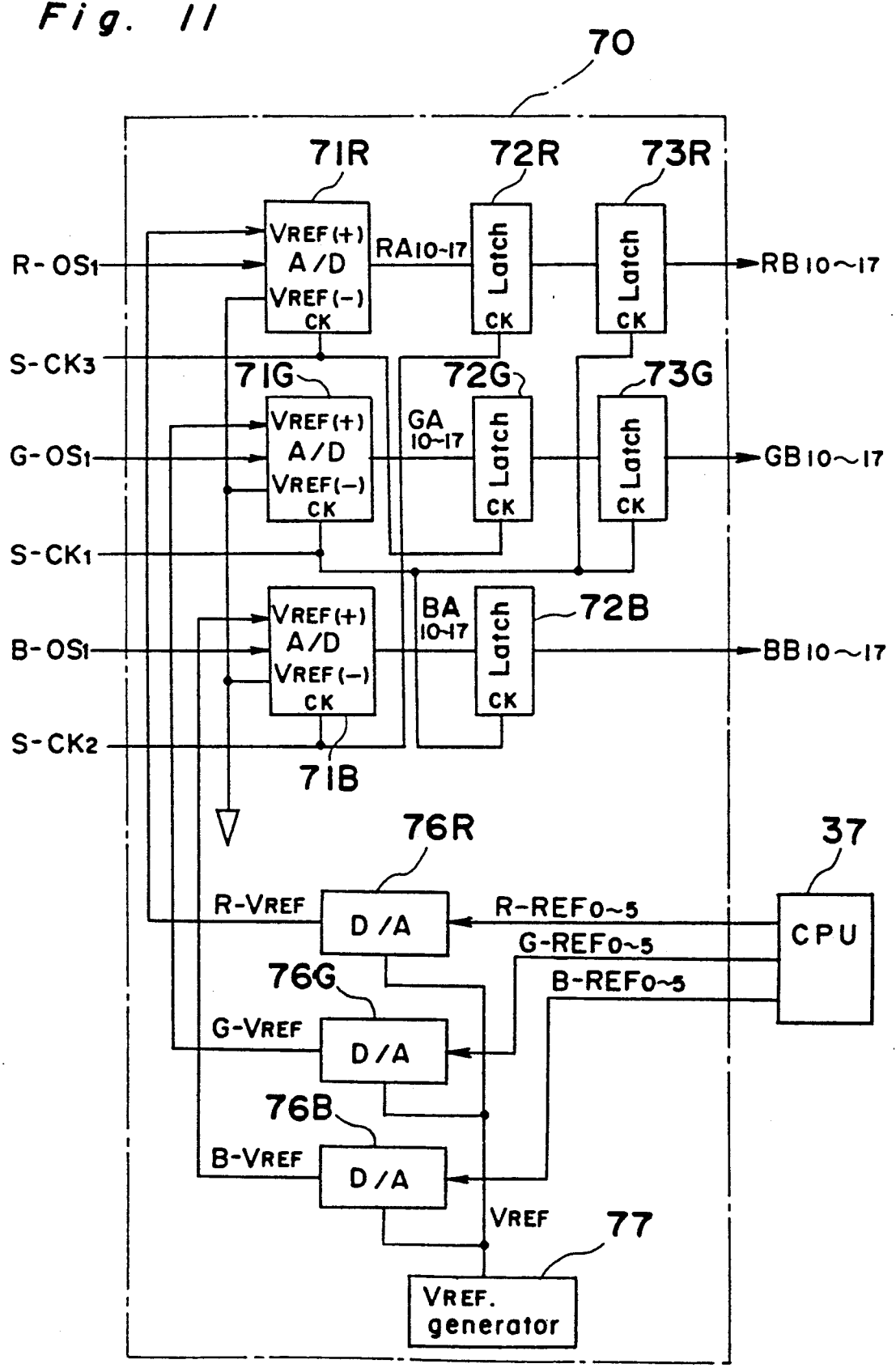
FIG. 11 is a block diagram of a digitalizing circuit shown in FIG. 7.
Figure 12:
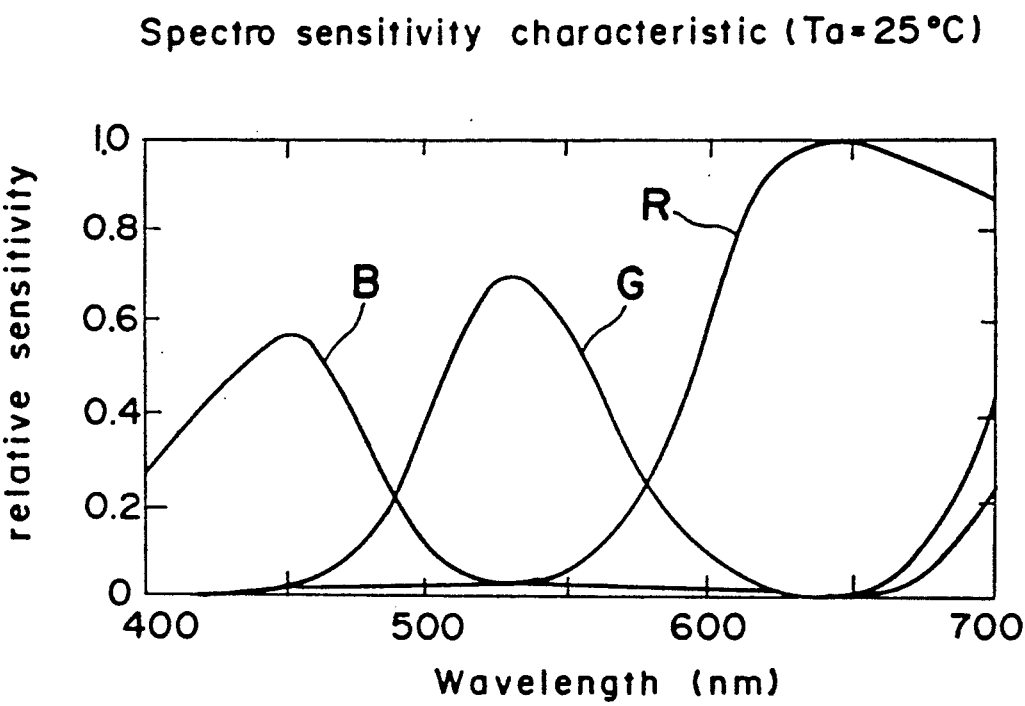
FIG. 12 is a graph showing spectral sensitivity of the CCD sensor to white light.
Figure 13:
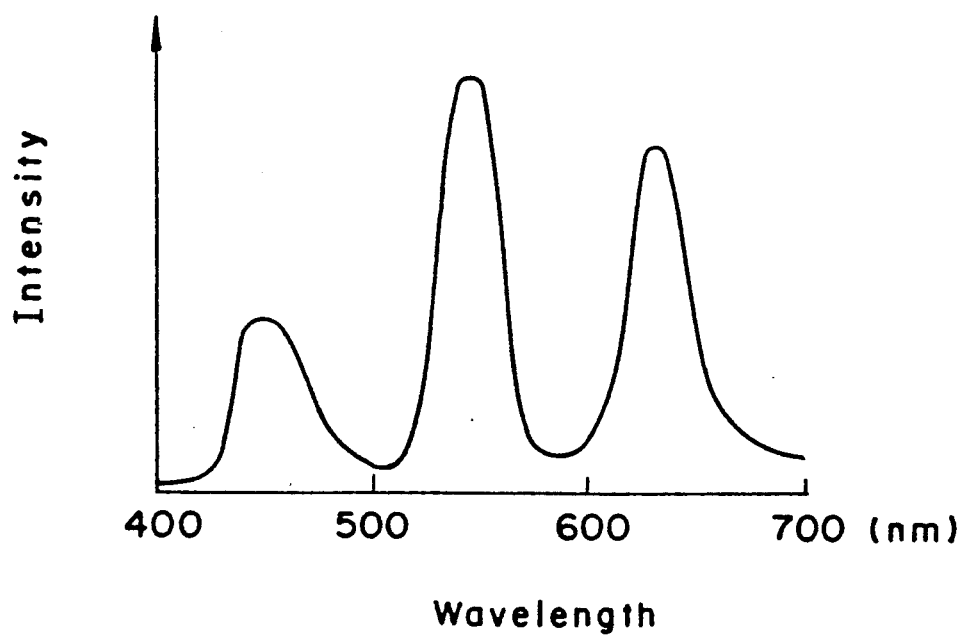
FIG. 13 is a graph showing spectral distribution of a light source.

These amplified image signals R-OS$_1$, G-OS$_1$ and BOS$_1$ are input into a digitalizing processing circuit 70 shown in FIG. 7 and FIG. 11. The digitalizing processing circuit 70 has three analogue to digital converters 71R, 71G and 71B, as shown in FIG. 11. Each of image signals R-OS$_1$, G-OS$_1$ and B-OS$_1$ is transformed into digital data RA$_{10\sim17}$, GA$_{10\sim17}$ or BA$_{10\sim17}$ of 8 bits in the order of clock pulses S-CK$_3$, S-CK$_1$ and S-CK$_2$.

Upon this transformation, the color balance correction is executed as will be explained later.

Digital data RA$_{10}$~RA$_{17}$, GA$_{10}$~GA$_{17}$ and BA$_{10}$~BA$_{17}$ of A/D converters 71R, 71G and 71B are shifted in their phases by one third of the period of the clock pulse.

Digital data RA$_{10}$~RA$_{17}$, GA$_{10}$~GA$_{17}$ and BA$_{10}$~BA$_{17}$ are latched by latch circuits 72R, 72G and 72B at timings of clock pulses S-CK$_2$, S-CK$_3$ and S-CK$_1$, respectively and, further, output digital data from the latch circuits 72R and 72G are latched respectively by latch circuits 73R and 73G at the timing of the clock S-CK$_1$.

Accordingly, digital data RB$_{10}$~RB$_{17}$, GB$_{10}$~GB$_{17}$ and BB$_{10}$~BB$_{17}$ outputted from the latch circuits 73R, 73G and 73B have the same phase with each other.

The color balance correction by each of the A/D converters 71R, 71G and 71B is performed by setting individual upper limits V$_{REF(+)}$ for respective A/D converters. All of lower limits for them are fixed at the voltage of the ground.

The reasons why the color balance correction is needed are that the dissolved primary color image signals do not have the same level even when a white paper of homogeneous density is read by CCD sensor 4 and that the spectral distribution of the fluorescent lamp as the light source has unequal intensities with respect to three primary colors R, G and B.

The color balance correction is performed according to the following steps.

1st step:

Upon starting the line scan, CPU 37 outputs digital data of maximum value 3F(HEX) to digital to analogue converters (D/A converter) 76R, 76G and 76B, respectively. At this stage, each of V$_{REF(+)}$ terminals of the A/D converters 71R, 71G and 71B is set at a reference voltage V$_{REF}$ generated by a standard voltage generating circuit 77. Then, CCD sensor 4 reads a white pattern of homogeneous density and digital data of dissolved color image signals of one line are stored in respective line memory.

2nd step:

CPU 37 reads out each of R, G and B digital data from respective line memory and determines the maximum value with respect to each of them.

3rd step:

CPU 37 determines data of 6 bits R-REF$_{0~5}$ in accordance with the detected maximum values within a range wherein they are not exceeded by digital image data RA$_{10~17}$, GA$_{10~17}$ and BA$_{10~17}$ and outputs them to digital to analogue (D/A) converters 76R, 76G and 76B, respectively.

4th step:

Each of D/A converters 76R, 76G and 76B calculates each of R-V$_{REF}$, G-V$_{REF}$ and B-V$_{REF}$ according to an equation $\{V_{REF}(X/164)\}$ wherein X is a value obtained by transforming each data of R-REF$_{10~16}$, G-REF$_{10~16}$ and B-REF$_{10~16}$ into a decimal number. Each of R-V$_{REF}$, G-V$_{REF}$ and B-V$_{REF}$ is outputted to each of A/D converters 71R, 71G and 71B.

Thus, individual upper limits are set to A/D converters 71R, 71G and 71B, respectively.

However, it is also possible to control each of color balances of R, G and B independently according to request from the host machine. For example, if R-REF$_{0~5}$ is set at a high level in the third step, the value of RA$_{0~7}$ becomes small. This enhances R color component as a whole.

Although the digitalizing processing circuit 70 only for the CCD sensor chip 11 is shown in FIG. 11, other image signals R-OS$_i$, G-OS$_i$ and B-OS$_i$ (i=2~5) are also processed by the same circuits 70, respectively.

(c) Serial output by CCD sensor

The digitalizing circuit 33 controls CCD sensor 4 so as to output signals OS$_1$ to OS$_5$ parallel from CCD sensor chips 11 to 15 in order to read them thereinto faster. As the result of that, it becomes necessary to convert effective picture element signals included in output signals OS$_1$ to OS$_5$ having been read parallel into a serial image signal of one scan line aligned in the order of OS$_1$ to OS5

Figure 14:
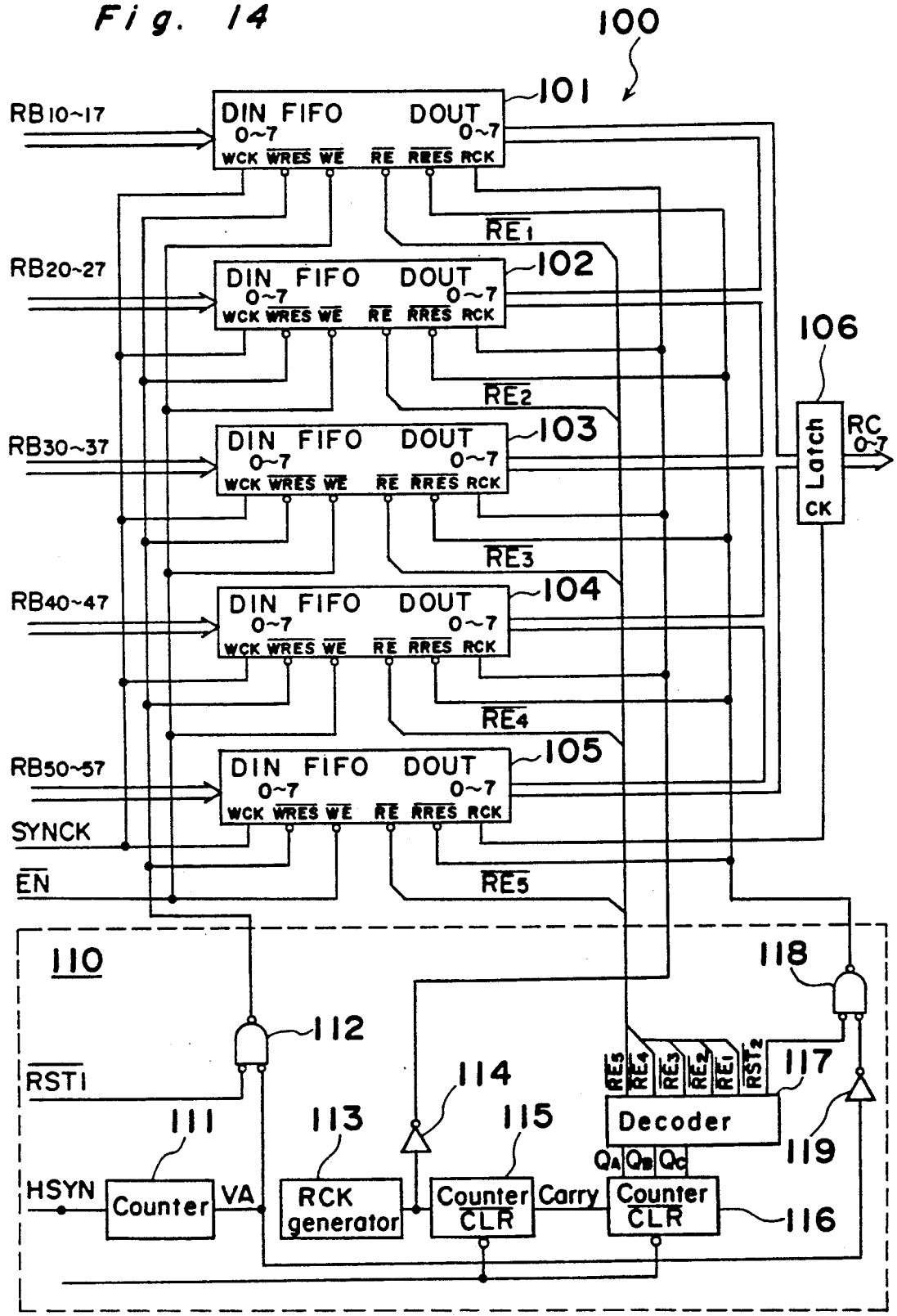
FIG. 14 is a block diagram of a parallel to serial converting circuit shown in FIG. 7.

Image signal data (RB$_{10~17}$, GB$_{10~17}$ and BB$_{10~17}$), (RB$_{20~27}$, GB$_{20~27}$ and BB$_{20~27}$), . . . and (RB$_{50~57}$, GB$_{50~57}$, BB$_{50~57}$) which have been digitalized in synchronous with each other (see FIG. 7) are stored once into corresponding FIFO (first-in-first-out) memories provided in a parallel to serial converting circuit 100 shown in FIG. 14.

Stored image signal data are read out serially in the order of alignment of CCD sensor chips 11 to 15 in synchronous with clock pulses.

Since the reading speed of data from the FIFO memory can be set higher than the upper limit of scanning speed of each CCD sensor chip, the reading of data can be made faster.

Figure 15:
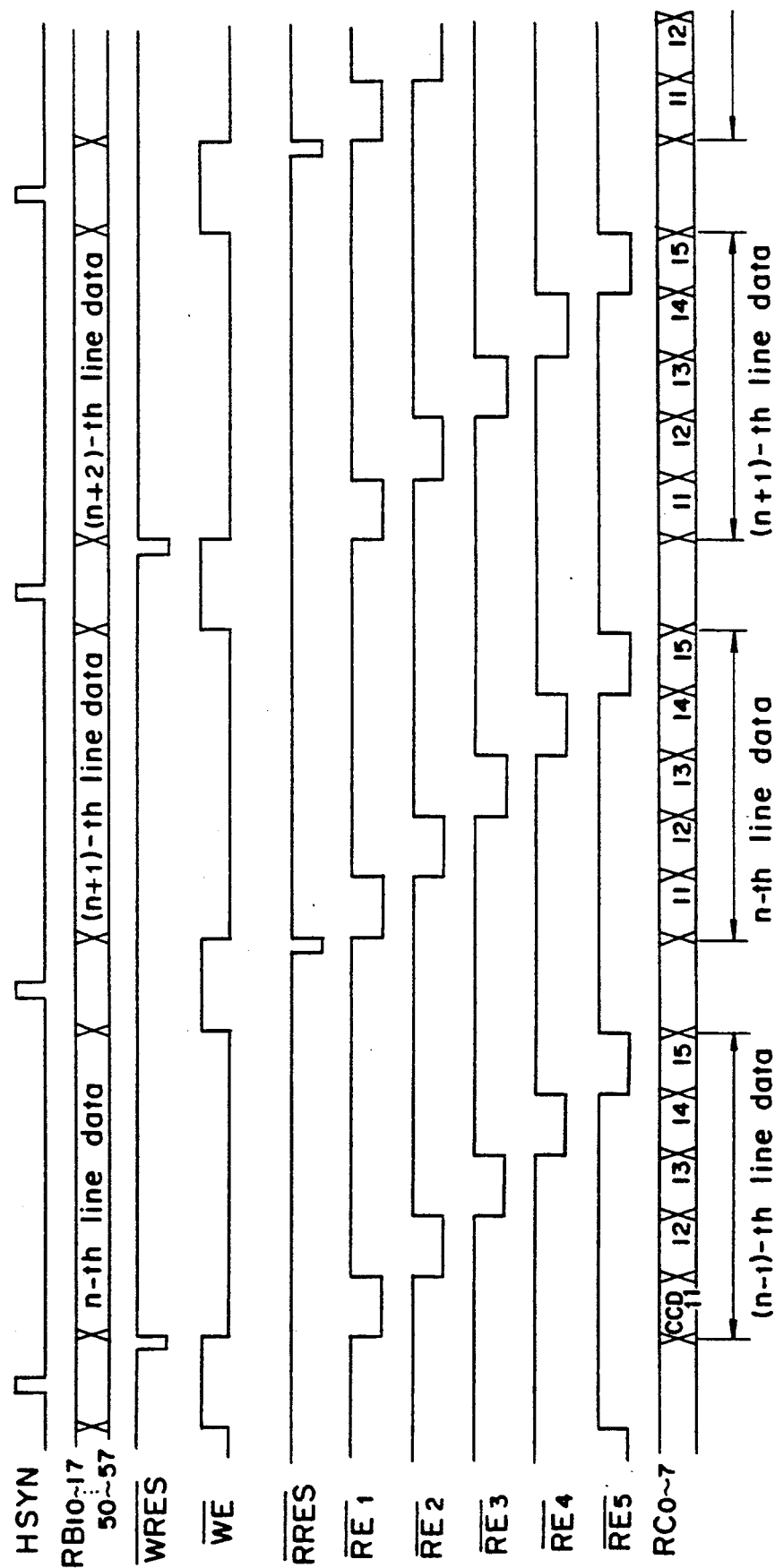
FIG. 15 is a timing chart for showing individual signals to be input into and outputted from the parallel to serial converting circuit.

FIG. 14 shows a block diagram of parallel to serial converting circuit 100 for converting parallel R image signal data RB$_{10~17}$, RB$_{20~27}$, RB$_{30~37}$, RB$_{40~47}$ and RB$_{50~57}$ into a serial signal data. Further, FIG. 15 shows a time chart of the P-S converting circuit shown in FIG. 14.

Although only the P-S converting circuit 100 for R image signal data is shown in FIG. 14, other color image signal data GB$_{10~17}$, . . . , GB$_{50~57}$, BB$_{10~17}$, . . . , BB$_{50~57}$ are also processed by the same P-S converting circuits 100, respectively.

As shown in FIG. 14, each of R image signal date RB$_{10~17}$, RB$_{20~27}$, RB$_{30~37}$, RB$_{40~47}$ and RB$_{50~57}$ is input into each DIN$_{0~7}$ terminal of FIFO memories 101 to 105.

The FIFO memory has characteristic functions in comparison with the ordinal static RAM as follows:

(i) It does not need address data in writing and reading cycles and data is written into and read out from it at rising edges of WCK and RCK, respectively.

(ii) Writing and reading operations can be done in completely asynchronous with each other, since it has dual ports DIN$_{0~7}$ and DOUT$_{0~7}$ for inputting and outputting data, respectively.

(iii) Since it is impossible to designate addresses for writing and reading data, input and output of data are always done in the manner of first-in.first-out.

(iv) Internal WRITE address and READ address are reset at zero by making address pointers $\overline{WRES}$ and $\overline{RRES}$ active, respectively.

Utilizing these features, the parallel to serial data conversion is done as follows.

Data of two lines in the direction of main scan are stored as one line data in FIFO memory and each reading operation is accessed after delaying it by one line from each writing operation in order to convert parallel data into serial data. If the number of effective picture elements of each CCD sensor chip is equal to n, each FIFO memory has a volume of 2n words. In the present preferred embodiment, FIFO memories of 2048×8 bits are used.

As shown in FIG. 15, R image signal data RB$_{10~17}$ to RB$_{50~57}$ are outputted as serial effective picture element signals in synchronous with HSYN outputted from CPU 37 which are delayed by a predetermined time interval as will be explained later. Though G and B image signal data GB$_{10~17}$ to GB$_{50~57}$ and BB10 17 to BB$_{50~57}$ are processed similarly, the following explanation is made with respect to R image signal data representatively.

A counter 111 counts synchronizing signals HSYN and outputs a signal VA. This signal VA is set at low level when a count value n is even and set at high level when it is odd in order to indicate that the present scan line number is even or odd. A reset signal $\overline{RST1}$ sent from CPU 37 is set at active "low" for an interval corresponding two picture element signals just before each of image signal data $RB_{10\sim17}$ to $RB_{50\sim57}$ becomes the first effective picture element signal and, when the signal VA is set at low level (the scan line number is even), is transmitted, via an OR gate 112, to individual WRITE reset terminals $\overline{WRES}$ of FIFO memories 101 to 105 in order to make each internal WRITE address of FIFO memories 101 to 105 zero. Next, a signal $\overline{EN}$ sent from CPU 37 is set at active "low" at positive progressing edge of the reset signal $\overline{RST}_1$, namely, when an interval for reset is ended. This signal $\overline{EN}$ holds each $\overline{WE}$ terminal of FIFO memories 101 to 105 at low level for an interval equivalent to 976 picture element signals (this number is equal to the number of effective picture elements) in order to hold each of FIFO memories 101 to 105 in WRITE enable state. Thus, writing of effective picture elements is started in synchronous with clock signals SYNCK. When all of effective picture element signals have been outputted, the signal $\overline{EN}$ is set at high level to set $\overline{WE}$ terminal at high level. As the result of that, the internal WRITE address is stopped at 976-th address.

Then, effective picture element signals of (n+1)-th scan line are outputted. In this stage, the internal WRITE address is held at 976-th address since the signal VA is set at high level (an odd scan line number). Therefore, each of FIFO memories 101 to 105 begins writing from 976-th address and continues it until the signal $\overline{WE}$ is set at high level.

The writing operation with respect to (n+2)-th and (n+3)-th scan lines is done similarly to the above.

The reading operation is done as follows.

RCK generating circuit 113 is an oscillator for generating pulses of 12.5 MHz which is equal to five times of a frequency of the synchronizing clock SYNCK (WCK) and sends clocks RCK, via an inverter 114, to each of FIFO memories 101 to 105. Each of FIFO memories is accessed at a positive progressing edge of the clock RCK.

A counter 115 counts clocks RCK after it is reset by the synchronizing signal HSYN. When it counts 64 RCK, it outputs a Carry signal of high level at first and outputs a Carry signal whenever it counts 976 PCK. Accordingly, it outputs six Carry signals with respect to every one scan line.

One more counter 116 counts Carry signals at respective positive progressing edges of them and outputs a count value as a binary number "$Q_A \cdot Q_B \cdot Q_C$" to a decoding circuit 117.

The decoding circuit 117 decodes the binary number "$Q_A \cdot Q_B \cdot Q_C$" and set a reset $\overline{RST}_2$ at low level when the decoded value is equal to zero. Further it sets READ enable signals from $\overline{RE}_1$ to $\overline{RE}_5$ at low level sequentially as the decoded value is increased from 1 to 5. An OR gate 118 makes each $\overline{RRES}$ (read reset) terminal of FIFO memories 101 to 105 active via an inverter 119 when the signal VA is at high level (an odd scan line) or when the signal $\overline{RST}_2$ is at low level. Due to this, each internal READ address of FIFO memories 101 to 105 is reset at zero. Then, respective FIFO memories 101 to 105 start respective read operations in synchronous with clocks RCK according to WRITE enable signals $\overline{RE}_1$ to $\overline{RE}_5$ outputted sequentially. Read out data are outputted as a serial signal $RC_{0\sim7}$ via a latch circuit 106.

Thus, each of FIFO memories 101 to 105 reads data of (n−1)-th line while writing data of n-th line, as shown in FIG. 5. The internal READ address is stopped only when the signal $\overline{RE}$ becomes high level. Further, the writing operation can be done without any trouble since the positive progressing edge of the WRITE clock SYNCK is adapted so as to locate in the stable output interval of each R image signal data.

The image data read from respective FIFO memories are latched by the latch circuit 106 and converted into a serial line data $RC_{0\sim7}$. B (blue) and G (green) image data are respectively converted into line data $BC_{0\sim7}$ and $GC_{0\sim7}$ with use of five FIFO memories.

Figure 16:
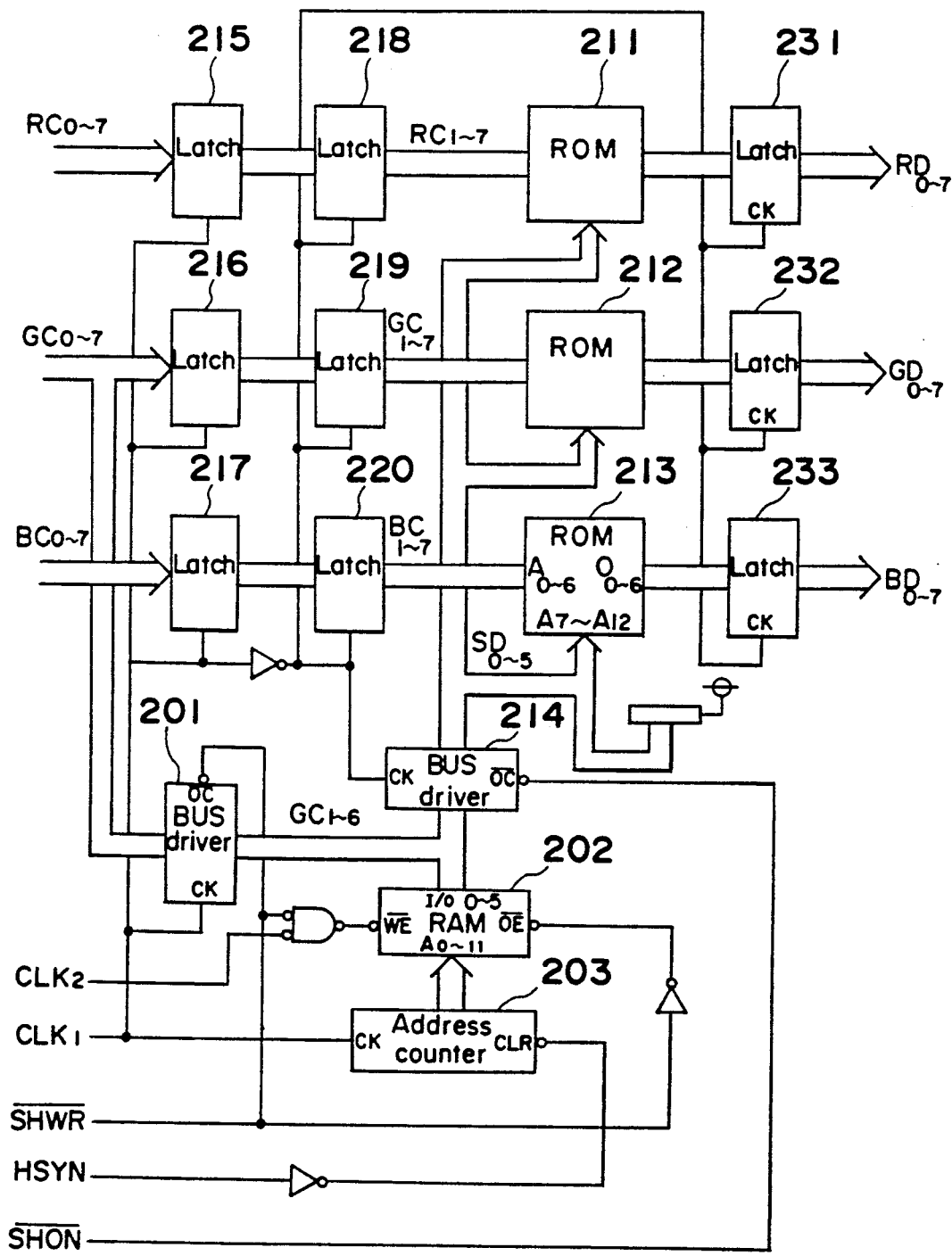
FIG. 16 is a block diagram of a shading & γ correction circuit.

Besides, it is possible to execute the reading and writing alternatively by providing FIFO memories for the odd line data and those for even line data with respect to each of CCD sensor chips. In this case, each FIFO memory has a volume of n words provided that the number of effective picture elements is equal to "n". p (d) Shading correction FIG. 16 shows a block diagram of a shading and so called correction circuit 34 and FIG. 18 shows a time chart of the shading and γ correcting circuit 34.

The shading correction is done to compensate uneven distributions of R, G and B light intensities of the light source in the main scanning direction and unevenness of sensitivity of CCD sensor 4.

At first, the standard white pattern 7 (see FIG. 1) of uniform density is read by CCD sensor 4 before starting a scan by the image reading apparatus and one line data of the pattern is stored, via a bus driver 201, in RAM 202. In order for that, an address counter 203 generates addresses to access RAM 202 sequentially in synchronous with clocks CK1. Besides, a signal $\overline{SHWR}$ is a signal which is kept at low level during one line in synchronous with the synchronizing signal HSYN upon reading the standard pattern 7. Lower six bits of G image signal $GC_{0\sim7}$ are stored in RAM 202 in accordance with the signal $\overline{SHWR}$. As standard or reference value to be stored in RAM 201, one line data of either one of three primary colors, for example $GC_{0\sim7}$ is used. The reason why one color data is used is to reduce the volume of RAM 201.

The standard data stored in RAM 202 is read out with respect to every scan line when the subscan is started and referred to each table stored beforehand in each of ROMs 211, 212 and 213 in synchronous with each of image data $RC_{0\sim7}$, $GC_{0\sim7}$ and $BC_{0\sim7}$ In respective ROMs 211, 212 and 213, predetermined correction data each for R, G and B image signals are stored respectively. The correction data includes both of shading correction and so called γ correction. The stored correction data is referred to in accordance with respective image data of $RC_{1\sim7}$, $GC_{1\sim7}$ and $BC_{1\sim7}$ and the standard data $SD_{0\sim5}$ input to each address terminal and, as the result of that, each of corrected data $RD_{0\sim7}$, $GD_{0\sim7}$ and $BD_{0\sim7}$ is outputted. A signal $\overline{SHON}$ is synchronized with the signal HSYN and is set at low level upon the shading correction and, according to the signal $\overline{SHON}$, a bus driver 214 inputs the standard data $SD_{0\sim5}$ into each upper address $A_{7\sim12}$ of ROMs 211, 212 and 213. Latch circuits 215, 216, 218, 219 and 220 and the bus driver 214 are provided for synchronizing image data with the standard data $SD_{0\sim5}$. Each of image data $RC_{1\sim7}$, $GC_{1\sim7}$ and $BC_{1\sim7}$ is input to each lower address $A_{0\sim6}$ of ROMs 211, 212 and 213. If no correction is needed, 3F (HEX) is input to each of ROMs 211, 212 and 213 by pulling up the bus of $SD_{0\sim 5}$. In this case, each of image data $RC_{1\sim 7}$, $GC_{1\sim 7}$ and $BC_{1\sim 7}$ is outputted without any correction.

In each table of ROMs 211, 212 and 213, the following data are written into.

Assuming that P (HEX) is data at the address $A_{0\sim 12}$ of each ROM, p is given by the following equation.

$$P = A_{0\sim 6} \text{ (HEX)} \times \frac{3F \text{ (HEX)}}{A_{7\sim 12} \text{ (HEX)}}$$

Each of corrected data $RD_{1\sim 7}$, $GD_{1\sim 7}$ and $BD_{1\sim 7}$ is obtained by referring to the table and is outputted to the magnification variation block 35 by each of latch circuits 231, 232 and 233 in the synchronized manner.

The preferred embodiments described herein are illustrative and not restrictive, the scope of the invention being indicated by the appended claims and all variations which come within the meanings of the claims are intended to be embraced herein.

What is claimed is:

1. An image reading apparatus comprising:
   an image reading device for line scanning an image of a document and outputting an analogue image signal, said image reading device including a line image sensor having plural sensor chips arranged along a line in the lengthwise direction of said line sensor, each of said sensor chips having image sensing devices and an output terminal for outputting an analogue signal from each image sensing device;
   plural analogue to digital conversion means for converting said analogue image signals outputted from said sensor chips, respectively, each of said conversion means being connected to the output terminal of each image sensor chip;
   plural memory means, associated with said plural analogue to digital conversion means, for storing image signals digitalized by said plural analogue to digital conversion means, each of said memory means being comprised of a first-in-first-out (FIFO) memory in which writing data thereinto and reading data thereform can be done asynchronously;
   driving means for driving said sensor chips in synchronization with one another;
   first pulse generating means for generating first clock pulses;
   second pulse generating means for generating second clock pulses having a frequency higher than a frequency of said first clock pulses;
   a control means for writing digitalized image signals from said plural sensor chips into said associated memory means in parallel and in synchronization with said first clock pulses and for outputting a serial image signal corresponding to a line scan ready by said image reading device by reading said digitalized image signals stored in respective memory means in sychronization with said second clock pulses and in the order of alignment of said plural sensor chips.

2. An image reading apparatus as claimed in claim 1, in which each sensor chip is comprised of a CCD sensor chip.

3. An image reading apparatus as claimed in claim 2, wherein respective adjacent CCD sensor chips are arranged in parallel with respect to a main scanning direction of said image reading devices and distant from each other by a width of a predetermined number of scan lines in a subscanning direction of said iamge reading devices.

4. An image reading apparatus as claimed in calim 3, wherein each of said CCD sensor chips has plural line shift gates corresponding to the number of CCD sensor chips.

5. An image reading apparatus as claimed in claim 1, wherein each of said plural memory means has a volume of memory capable of storing image signals of two lines outputted from each sensor chip and said cotnrol means controls associated memory means so as to write image signals of the next line thereinto while reading image signals stored therein.

6. An image reading apparatus having:
   an illuminating means for illuminating a document;
   an image reading means for reading an iamge of the illuminated document by transducing the light reflected from the document into electric signals, said image reading means being comprised of plural CCD sensor chips arranged in a main scanning direction each of which has a signal output terminal;
   a scanning means for line scanning said document by moving said document and image reading means relatively in a subscan direction;
   a driving means for driving said CCD sensor chips in parallel in order to output analogue image signals from respective signal output terminals of said plural sensor chips;
   plural analogue to digital conversion means, associated with each CCD sensor chip, for converting analogue image signals into digital image signals;
   plural memory means, associated with each CCD sensor chip, for storing said digital image signals converted by said analogue to digital conversion means, each of said plural memory means being comprised of a first-in-first-out (FIFO) memroy in which writing data thereinto and reading data thereform can be done asynchronously; and
   a control means for writing digitalized image signals from said plural sensor chips into said associated memory means in parallel and for outputting a serial image signal from said associated memory means in the order of alignment of said plural sensor chips, wherein respective adjacent CCD sensor chips are arranged in parallel with respect to the main scanning direction of said image reading means and distant from each other by a width of a predetermined number of scan lines in the subscanning direction of said image reading means.

7. An image reading apparatus as claimed in claim 6, wherein each of said CCD sensor chips has plural line shift gates corresponding to the number of CCD sensor chips.

8. An image reading apparatus as claimed in claim 7, wherein each of said plural memory means provides first and second memory areas each having an area for memorizing one line data of each CCD sensor chip and said each memory means is controlled so as to read image signals from either one of said first and second memory areas when image signals are written into the other memory area.

9. An image reading apparatus comprising:
   an image reading device for line scanning an image of a document and outputting an analogue image signal, said image reading device including a line image sensor having plural sensor chips arranged along a line in the lengthwise direction of said line sensor, each of said sensor chips having a plurality of image sensing devices and an output terminal for outputting an analogue signal from each image sensing device;

plural analogue to digital conversion means for converting said analogue image signals outputted from said sensor chips, respectively, each of said conversion means being connected to the output terminal of each image sensor chip;

plural memory means, associated with said plural analogue to digital conversion means, for storing image signals digitized by said plural analogue to digital conversion means, each of said memory means including a first-in-first-out (FIFO) memory in which writing data thereinto and reading data therefrom can be done asynchronously;

driving means for driving said sensor chips in synchronization with one another;

first pulse generating means for generating first clock pulses;

second pulse generating means for generating second clock pulses at a frequency higher than a frequency of said first clock pulses; and control means for writing digitalized image signals into each of said memory means in parallel in sychronization with said first clock pulses and for outputting a serial image signal corresponding to a scan line of the document by reading said digitalized image signals stored in associated memory means in synchronization with said second clock pulses.

10. An image reading apparatus comprising:

an image reading device for line scanning an image of a document and outputting an analogue image signal, said image reading device including a line image sensor having plural sensor chips arranged along a line;

first pulse generating means for generating first clock pulses;

second pulse generating means for generating second clock pulses having a frequency higher than a frequency of said first clock pulses;

driving means for driving said sensor chips in synchronization with one another;

plural analogue to digital conversion means for converting said analogue image signals outputted from said sensor chips, respectively, each of said convesion means being connected to the output terminal of each image sensor chip;

plural memory means, associated with said plural analogue to digital conversion means, for storing image signals digitalized by said plural analogue to digital conversion means, each of said memory means including a first-in-first-out (FIFO) memory in which writing data thereinto and reading data therefrom can be done asyncrhonously; and a control means for writing digitalized image signals from said plural sensor chips into said associated memory means in parallel and in synchronization with said first clock pulses and for outputting a serial image signal from said associated memory means in synchronization with said second clock pulses and in the order of alignment of said plural sensor chips.

* * * * *